(No Model.)
J. A. WRIGHT.
TACK CATCHER FOR BICYCLES.
No. 542,672. Patented July 16, 1895.
Fig. 1.
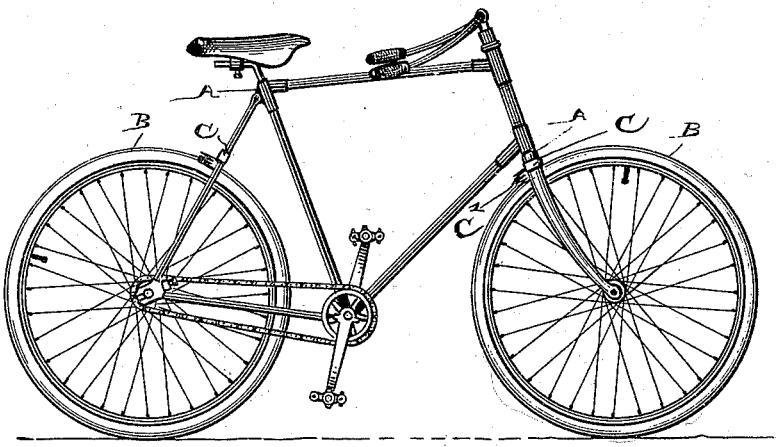
Fig. 2.
Fig. 3.
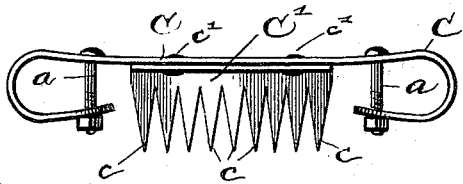
Fig. 4.
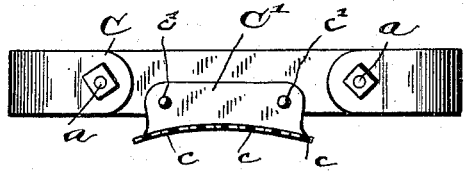
WITNESSES:
H. P. Nealy.
J. A. Walsh.
INVENTOR
John A. Wright,
By Chester Bradford,
ATTORNEY.

UNITED STATES PATENT OFFICE.

JOHN A. WRIGHT, OF INDIANAPOLIS, INDIANA.

TACK-CATCHER FOR BICYCLES.

SPECIFICATION forming part of Letters Patent No. 542,672, dated July 16, 1895.

Application filed April 17, 1895. Serial No. 546,106. (No model.)

*To all whom it may concern:*

Be it known that I, JOHN A. WRIGHT, a citizen of the United States, residing at Indianapolis, in the county of Marion and State of Indiana, have invented certain new and useful Improvements in Tack-Catchers for Bicycles, of which the following is a specification.

As is well known, tacks are very destructive of bicycle tires as ordinarily constructed, and various means of protecting such tires have been adopted, among which is the subject-matter of my Patent No. 502,390, dated August 1, 1893, which is the best and most effective of any with which I am acquainted, and which will always prevent puncture of the tire from the first coming in contact therewith; but if the tack is allowed to remain with its point entering the outer surface of such tire it will be driven in farther and farther at each revolution of the wheel, and a puncture will presently be completed and the tire substantially ruined, or at least put under the necessity of repair. It is very desirable, therefore, when a tack is caught on such a tire, that it shall be removed as early as possible, before the puncture is completed, and if this can be done before more than one revolution of the wheel has been made no damage will result, as tacks never puncture a tire of the character above described completely at first contact therewith. To secure such removal, and thus obviate the disadvantages stated, is the purpose of my invention, which, generally speaking, consists in a comb-like structure connected to the forks of the bicycle-frame immediately above the surface of such a tire as above described, as will be hereinafter more particularly described and claimed.

Referring to the accompanying drawings, which are made a part hereof, and on which similar letters of reference indicate similar parts, Figure 1 is a side elevation of a bicycle provided with tack-catchers constructed in accordance with my invention; Fig. 2, a perspective view showing a fragment of the frame with a tack-catcher thereon and a fragment of the rim of the wheel with a tack therein just before it comes in contact with my improved tack-catcher; Fig. 3, a top or plan view of the tack-catcher separately, and Fig. 4 a front elevation thereof.

In said drawings the portions marked A represent the frame of the bicycle, B the pneumatic tire, and C C' the tack-catcher.

The frame A and most other parts are or may be of any ordinary or desired construction.

The tire B is of a character similar to that described in my Letters Patent above referred to.

The tack-catcher consists of a strip of sheet metal C, bent in the form shown in Fig. 3, with a curved comb-like device C' secured thereto, having pointed teeth $c$. The ends of the main bar or strip C are bent around, as shown, so as to embrace the forks of the frame A, to which they are secured by bolts $a$. The teeth $c$ are like slim saw-teeth in form, and obviously as a tack, as $b$, is carried around by the tire the body of such tack will pass between two of these teeth, while the head will be above them, and thus, as the tire passes on, the tack will be drawn out and thrown away. The portion C' is curved, as shown, so as to conform more closely to the surface of the tire and insure that all tacks shall be caught thereby. This part should be formed of steel or other hard stiff metal, so that that there shall be no danger of the teeth bending down and themselves puncturing the tire. The strip C which passes about the frame should be tough and flexible, in order to be easily clamped in place.

Of course it is possible to form this device from a single piece of metal if desired, but the form and relative conditions of the parts can be better secured by forming it in two pieces and securing them together by rivets $c'$, as shown.

Having thus fully described my said invention, what I claim as new, and desire to secure by Letters Patent, is—

1. The combination, with a bicycle tire of the class described, of a tack catcher consisting of a frame strip adapted to be secured to the forks of the bicycle frame above the tires, and a curved comb-like structure having pointed teeth extending out substantially parallel with the surface of the tire and adapted to catch and withdraw tacks which may have caught on the tire from said tire as the wheels revolve, all substantially as shown and described.

2. The combination, with a bicycle, of a tack catcher composed of a strip of metal adapted to be bent about the forks of the frame and there secured by bolts as shown, and a second toothed or comb-like piece of metal curved to correspond substantially with the contour of the tire and formed of hard metal not easily bent and secured to the strip attached to the frame forks, substantially as shown and described.

3. A tack catcher for bicycles consisting of a comb-like structure adapted to be attached to the frame of a bicycle above the surface of the tire and to catch and withdraw tacks from the tire as the wheel revolves, substantially as set forth.

In witness whereof I have hereunto set my hand and seal, at Indianapolis, Indiana, this 12th day of April, A. D. 1895.

JNO. A. WRIGHT. [L. S.]

Witnesses:
CHESTER BRADFORD,
JAMES A. WALSH.